United States Patent [19]

Arendt

[11] 4,192,518

[45] Mar. 11, 1980

[54] DEVICE FOR SEALING AN APERTURE IN A PARTITION WALL THROUGH WHICH A ROTATING DRUM EXTENDS

[76] Inventor: Hans F. Arendt, Bleichinsel, 712 Bietigheim, Fed. Rep. of Germany

[21] Appl. No.: 961,065

[22] Filed: Nov. 15, 1978

[51] Int. Cl.² .......................... F16J 15/38; F16J 15/40
[52] U.S. Cl. .......................................... 277/27; 277/39; 277/65; 277/92
[58] Field of Search ...................... 277/3, 27, 81 R, 65, 277/92, 95, 38, 39, 152, 165, 17–19, 135

[56] References Cited

U.S. PATENT DOCUMENTS

| | | | |
|---|---|---|---|
| 2,137,546 | 11/1938 | Searles | 277/39 |
| 2,192,305 | 3/1940 | Gilman | 277/39 |
| 2,245,475 | 6/1941 | Hately | 277/38 |
| 2,853,020 | 9/1958 | Hollinger et al. | 277/92 X |
| 2,888,281 | 5/1959 | Ratti | 277/38 X |
| 3,504,917 | 4/1970 | Malmstrom | 277/95 X |
| 3,907,310 | 9/1975 | Dufour | 277/92 |
| 3,912,284 | 10/1975 | Gosling et al. | 277/18 |

*Primary Examiner*—Robert S. Ward, Jr.
*Attorney, Agent, or Firm*—Schwartz, Jeffery, Schwaab, Mack, Blumenthal & Koch

[57] ABSTRACT

A sealing device is disclosed which is particularly useful in connection with an aperture in a partition wall through which a rotating drum extends. The sealing device may be used to seal one side of the wall from the other. The sealing device may find applicability to situations where different conditions are maintained on opposite sides of the partition wall. For example, the drum may be a washing machine drum in a hospital laundry, and the partition wall may separate an area where aseptic conditions are maintained from an area which is not aseptic.

24 Claims, 3 Drawing Figures

U.S. Patent   Mar. 11, 1980   4,192,518
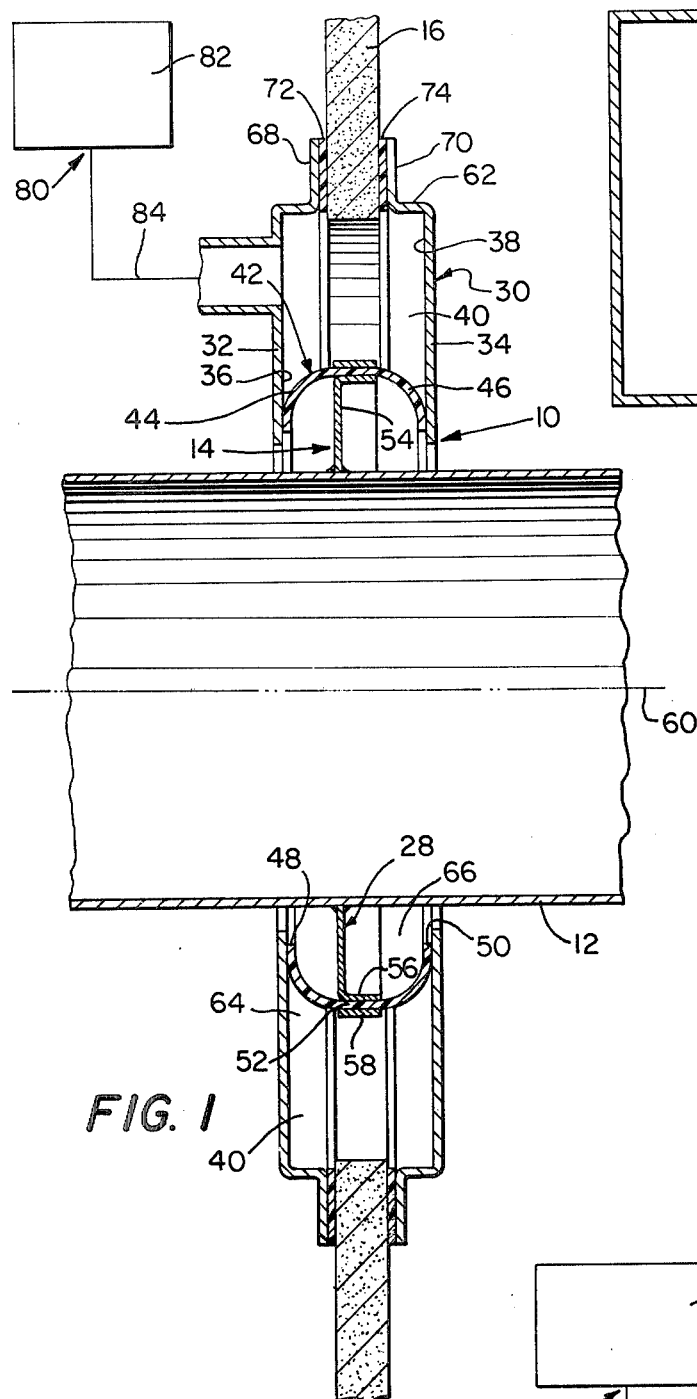
FIG. 1
FIG. 2
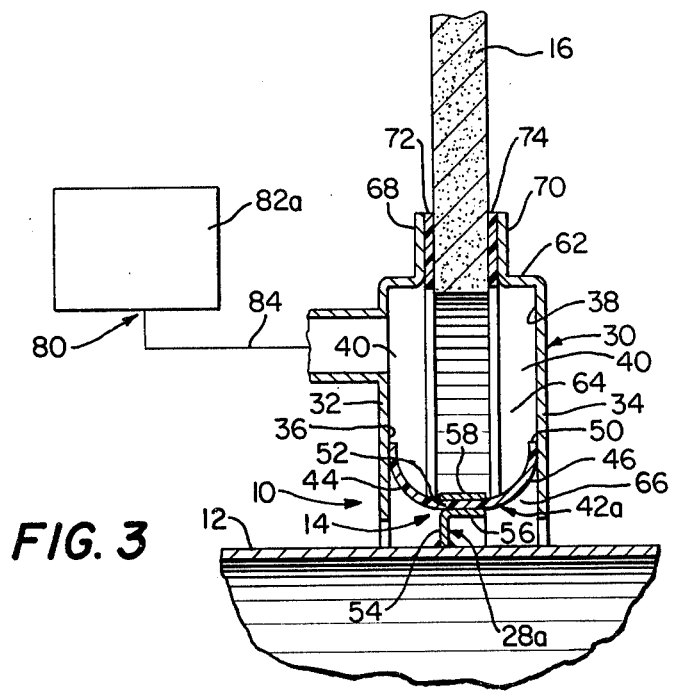
FIG. 3

DEVICE FOR SEALING AN APERTURE IN A PARTITION WALL THROUGH WHICH A ROTATING DRUM EXTENDS

BACKGROUND

The present invention relates to a device for sealing an aperture in a partition wall through which a rotating drum extends.

The sealing device may be used in connection with washing machine drums in hospital laundries. In such circumstances, there may be a requirement that the inlet and outlet sides of the drum are open and that the areas around the ends of the drum are separated and sealed off from each other by a partition wall which enables the outlet side to be located in a room which may be kept safe against bacteria.

It is therefore an object of the present invention to provide a device and arrangement wherein the inlet and outlet sides of the rotating drum may be separated by a partition wall which provides an area or room in which an outlet side may be kept safe against bacteria.

It is a more general object of the present invention to provide a device for sealing an aperture in a partition wall through which a rotating drum extends.

It is another object of the invention to provide a device for sealing an aperture in a partition wall wherein the sealing device includes an isolated sealing space.

It is a related object of the invention to provide such a device wherein the sealing space is either pressurized or evacuated to enhance sealing and/or disinfecting.

These and other advantages and objects of the present invention will be apparent from the following description and from the drawing.

SUMMARY

To achieve the foregoing objects, a device is provided for sealing an aperture in a partition wall through which partition wall a rotating drum extends. The partition wall may separate septic and aseptic portions of a hospital laundry from each other. That is, the partition wall may define on one side an aseptic area and on the other side an area which is not aseptic. A rotatably mounted drum, such as a washing machine drum, may extend through an aperture in the partition wall to both sides of the wall, for example, to an aseptic side and to a side which is not aseptic.

The sealing device includes a first annular member attached to the drum and extending radially outwardly therefrom and a second annular member attached to the partition wall and extending radially inwardly from the aperture therein. The second annular member has first and second spaced surfaces partially defining an annular sealing space. The sealing device includes sealing means extending between, on the one hand, the spaced sealing surfaces of the second annular member and, on the other hand, the first annular member. The sealing means includes a first sealing lip extending between a first annular member and the first sealing surface and a second sealing lip extending between the first annular member and the second sealing surface. Thus, oppositely disposed sides of the partition wall are isolated from each other by the annular sealing space.

The sealing device may include means for producing a pressure other than atmospheric pressure in the sealing space. This may be a source of pressurized, sterilized air, or at least purified air, and a conduit effecting introduction of such pressurized air into the annular sealing space. Alternatively, this may be a vacuum pump and a conduit effecting communication between the vacuum pump and the sealing space, whereby the vacuum pump continuously evacuates the sealing space, or a conduit introducing a disinfectant and/or a lubricant.

The first annular member of the sealing device is fixed to the rotatable drum, and the sealing means may be fixed to the first annular member. The sealing means movingly engages the first and second sealing surfaces of the second annular member. The sealing means includes first and second oppositely disposed free edges and a central portion therebetween. The first seal extends from the first free edge to the central portion and the second seal extends from the second free edge to the central portion. The sealing means has a concave inward or convex inward configuration with respect to the drum and with respect to the first annular member, depending on whether a pressure or vacuum is used. A convex inward configuration is used in the case of sealing pressure and a concave inward configuration is used in the case of a sealing by vacuum.

The first annular member includes a main wall and, at the radially outermost portion of the main wall, a rigid annular rim with a surface generally perpendicular to the main wall. The central portion of the sealing means is affixed to the rim in abutting, face-to-face, overlying relationship therewith. The first annular member and the rotatable drum have a common axis of rotation. The main wall of the first annular member is disposed in a plane perpendicular to the axis of rotation of the first annular member. The first and second spaced surfaces of the second annular member are parallel to each other and parallel to the main wall of the first annular member. The first and second surfaces are thereby disposed in planes perpendicular to the axis of rotation of the first annular member and drum. The central portion of the sealing means is disposed in perpendicular relationship to the first and second sealing surface. The area of the sealing means adjacent the first free edge thereof is disposed in parallel relationship with the first sealing surface of the second annular member and the area of the sealing means adjacent the second free edge is disposed in parallel relationship with the second sealing surface. That is, the first and second sealing surfaces are tangential to the sealing means. The sealing means is a one piece, flexible, elastomeric member.

The second annular member includes an outer annular wall perpendicular to the first and second sealing surfaces and extending at least partially therebetween at the radially outermost portion of the second annular member. The outer annular wall and first and second sealing surfaces at least partially define a radially inwardly facing recess in the second annular member. The radially inwardly facing recess has a mouth at a portion thereof in the region of the radially innermost side of the second annular member. The sealing means extends across this mouth to seal the same and to isolate the recess from the surrounding atmosphere to thereby provide the annular sealing space.

The second annular member includes first and second flanges which extend radially outwardly from the outer wall thereof, the flanges being parallel with the main wall of the first annular member and perpendicular to the axis of rotation thereof. The first outer flange includes first gasket means, and the second outer flange includes second gasket means. The first outer flange and first gasket means sealingly engage one side of the partition wall. Similarly, the second outer flange and second gasket means sealingly engage the outer side of the partition wall.

BRIEF DESCRIPTION OF THE DRAWING

FIG. 1 is a sectional view of a partition wall, sealing device and rotating drum according to the present invention. FIG. 1 also includes a schematic showing of a vacuum producing device, connected to the sealing device for producing a vacuum in a sealing space in the sealing device;

FIG. 2 is a schematic view of two rooms which are sealingly separated from each by a partition wall including an aperture through which a rotating drum extends, the partition wall and one of the annular members of the sealing device being shown in cross section.

FIG. 3 is a fragmentary sectional view, similar to part of the view of FIG. 1, showing a seal for a rotating drum according to the present invention. FIG. 3 also includes a schematic showing of a device, connected to the sealing device, for producing a pressure greater than atmospheric pressure in the sealing space of the sealing device.

DETAILED DESCRIPTION

Referring to the drawing, reference numeral 10 generally refers to the sealing device of the present invention. The sealing device 10 is interposed between a rotatable drum 12 and an aperture 14 in a partition 16. The partition wall separates two areas in which different conditions must be maintained. For instance, the partition wall may separate an aseptic room 18 at the outlet side 20 of the drum from another room or area 22 which is not aseptic, room 22 being at the inlet side 24 of the drum. Drum 12 may be rotatably mounted on supports 26 and rotated by conventional drive means 27. In particular, drum 12 may be of a type used in connection with a washing machine for a hospital laundry.

Sealing device 10 includes a first annular member generallly referred to by reference character 28 and a second annular member generally referred to by reference character 30. First annular member 28 is fixedly attached to the outer circumference of the drum 12 and extends radially outward therefrom. Thus, first annular member 28 rotates with drum 12.

Second annular member 30 is attached to the partition wall 16 in the region of aperture 14 and extends radially inwardly into aperture 14. Of course, the inward extension of second annular member 30 is such that it remains spaced from the drum 12 in surrounding relationship with respect thereto. Second annular member 30 includes a pair of parallel walls 32, 34, preferably of stainless steel. Wall 32 provides a first sealing surface 36, and wall 34 provides a second sealing surface 38. Surfaces 36, 38 face each other and are spaced apart. Surfaces 36, 38 partially define an enclosed annular sealing space 40.

A sealing means, generally referred to by reference character 42, extends between, on one hand, the spaced sealing surfaces 36, 38 of the second annular member 30 and, on the other hand, the first annular member 28. Sealing means 42 includes a first sealing lip 44 extending between first annular member 28 and sealing surface 36 and a second sealing lip 46 extending between first annular member 28 and second sealing surface 38. Sealing means 42 movingly engages surfaces 36, 38 of second annular member 30.

Sealing means 42 includes a first free edge 48 disposed in immediate juxtaposition to the first sealing surface 36 and a second free edge 50 disposed in immediate juxtaposition to the second sealing surface 38. The first free edge 48 is disposed opposite the second free edge 50. Sealing means 42 also includes a central portion 52 disposed between free edges 48, 50. The first sealing lip 44 extends from the first free edge 48 to the central portion 52, and the second sealing lip 46 extends from the second free edge 50 to the central portion 52. The sealing means 42 has a concave inward (FIG. 1) or convex inward (FIG. 3) configuration with respect to the drum 12 and with respect to first annular member 28 depending on whether a vacuum or pressure is used.

The first annular member 28 includes a main wall 54 and, at the radially outermost portion of main wall 54, a rigid annular rim 56 with a surface generally perpendicular to main wall 54. The central portion 52 of sealing means 42 is affixed to rim 46 in abutting face-to-face overlying relationship therewith. The fixing of central portion 52 to rim 56 may be accomplished by an annular clamp ring 58.

First annular member 28 and rotatable drum 12 have a common axis of rotation 60. Main wall 54 of first annular member 28 is disposed in a plane perpendicular to axis of rotation 60 of first annular member 28, as will be apparent from FIG. 1. The first and second sealing surfaces 36, 38 of second annular member 30 are parallel to each other and parallel to main wall 54 of first annular member 28. Thus, surfaces 36, 38 are disposed in planes perpendicular to axis of rotation 60 of first annular member 28 and drum 12. Central portion 52 of sealing means 42 is disposed in perpendicular relationship to first and second sealing surfaces 36, 38, as will be apparent from FIG. 1. The area of sealing means 42 immediately adjacent first free edge 48 is disposed in parallel relationship with the first sealing surface 36. Similarly, area of sealing means 42 immediately adjacent second free edge 50 is disposed in parallel relationship with the second sealing surface 38. With this construction, the sealing surfaces 36, 38 are tangential to the curved sealing lips 44, 46 of sealing means 42. This tangential relationship provides a very effective seal. It ensures full contact of sealing lips 44, 46 with sealing surfaces 36, 38 to provide a tight seal, and yet the construction avoids a large sealing area thereby minimizing friction and wear. This tangential relationship between the sealing lips 44, 46 and sealing surfaces 36, 38 also results in effective sealing contact with a minimum of force or pressure between the sealing lips and sealing surfaces. The result is effective sealing without excessive wear or resistance to movement.

Sealing means 42, which includes sealing lips 44, 46 has an elastically yielding property. Preferably, sealing means 42 is a one-piece, flexible, elastomeric member.

The second annular member 30 includes an outer annular wall 62 perpendicular to surfaces 36, 38 and extending at least partially therebetween at the radially outermost portion of second annular member 30. Outer annular wall 62, and walls 32, 34, which provide surfaces 36, 38, in conjunction with partition wall 16, define a radially inwardly facing recess 64 in second annular member 30, recess 64 having a mouth 66. Sealing means 42 extends across mouth 66 to seal the same and to isolate recess 60 from the surrounding atmosphere to thereby provide sealing space 40.

Second annular member 30 includes a first flange 68 disposed on the same side of member 30 as first sealing surface 36. By the same token, member 30 includes a second flange 70 disposed on the same side of member 30 as the second sealing surface 38. Flanges 68, 70 extend radially outwardly from outer wall 62. Flanges 68, 70 are parallel with main wall 54 of annular member 28 and perpendicular to axis 60. First flange 68 includes a first gasket 72, and second flange 70 includes a second gasket 74. Flange 68 and associated gasket 72 sealingly engage partition wall 16 at the side 76 thereof facing room 18. Flange 70 and associated gasket 74 sealingly engage partition wall 16 at the side 78 thereof which faces room 22. Flanges 68, 70 may be joined to each other and to partition wall 16 by conventional fasteners such as bolts (not shown).

In the arrangement described above, the opposite sides 76, 78 of partition wall 16 are isolated from each other by the sealing space 40. In effect there is a double seal, i.e. a seal in the region where sealing lip 46 engages sealing surface 38 and another seal in the region where sealing lip 44 engages sealing surface 46. Such arrangement is very effective in maintaining different conditions in rooms 18 and 22; for instance, such a seal is very effective in preventing possibly contaminated air in room 22 from reaching aseptic room 18.

To even further increase the effectiveness of the sealing device described herein, the sealing device 10 may include a device for producing a pressure other than atmospheric pressure in the sealing space 40. In FIG. 1 such device is a device for producing a partial vacuum, which device is referred to generally by reference numeral 80. Device 80 may include a vacuum pump 82 and a conduit 84 effecting communication with sealing space 40. As will be apparent from FIG. 1, conduit 84 is connected for communication with second annular member 30 and, in particular, sealing space 40 thereof.

Producing a partial vacuum in sealing space 40 requires convex sealing means as shown in FIG. 1. In this case element 82 is a vacuum pump connected for communication with sealing space 40 by conduit 84. With such an arrangement, any contaminated air which might possibly leak past the seal provided by sealing lip 46 and its associated sealing surface 38 will be promptly evacuated from the sealing space 40, virtually eliminating any possibility of leakage of contaminated air in room 22 past the seal provided by lip 44 and surface 36 into aseptic room 18.

Alternatively, the device 80 for producing other than atmospheric pressure in sealing space 40 may be a device 82a for producing a pressure above atmospheric pressure in sealing space 40, requiring convex inward sealing means 42a as shown in FIG. 3. In this case a pressure pump 82a is connected for communication with sealing space 40 by conduit 84. With such an arrangement, the first annular member is shorter, i.e. it extends less far radially outwardly than does the first annular member 28 shown in FIG. 1. This shorter annular member is referred to by reference character 28a in FIG. 3.

Since the air fed into sealing space 40 by source 82a is at a higher pressure than the surrounding atmospheric pressure, no leakage can possibly occur across the sealing device 10, provided that sealing means 42 has a convex inward configuration with respect to the drum as shown in FIG. 3. In particular, the higher than atmospheric pressure in sealing space 40 ensures that any leakage through the seals provided by sealing lips 44, 46 and sealing surfaces 36, 38 which they engage will be an outward leakage from the sealing space 40 into the surrounding rooms 18, 22. Since the pressurized air in sealing space 40 is purified or sterilized, only purified or sterilized air from source 82 can leak into aseptic room 18. Thus, there is no possibility of leakage of contaminated air from room 22 into room 18. Instead of or in addition to air, liquid or gaseous disinfectants may be introduced by device 80. Likewise, a lubricant may be added.

In the foregoing description, like reference characters have been used among the figures of the drawing to refer to like elements or features.

The foregoing description and the drawing are to exemplify the invention. It will be apparent to those skilled in the art that various modifications and different embodiments are possible without departing from the spirit and scope of the invention. For instance, while attachment of the sealing means 42 to the first annular member 28 has been shown and described in connection with FIGS. 1 and 2, the arrangement could be modified so that one or more sealing means are attached to the second annular member 30 for moving cooperation with the first annular member 28.

What is claimed is:

1. A device for sealing an aperture in a partition wall having opposed sides through which partition wall a rotating drum extends, the device comprising:
  (a) a first annular member attached to the drum and extending radially outwardly therefrom;
  (b) a second annular member attached to the partition wall and extending radially inwardly into the aperture therein, said second annular member having first and second spaced surfaces which partially define an annular sealing space;
  (c) sealing means extending between, on the one hand, said spaced surfaces of said second annular member and, on the other hand, said first annular member;
  (d) whereby the opposed sides of said partition wall are isolated from each other by said sealing space.

2. A device for sealing an aperture in a partition wall as defined in claim 1, including means for producing a pressure other than atmospheric pressure in said sealing space.

3. A device for sealing an aperture in a partition wall as defined in claim 2, wherein said means for producing a pressure other than atmospheric is a source of pressurized, purified air and a conduit effecting introduction of pressurized, purified air into said sealing space.

4. A device for sealing an aperture in a partition wall as defined in claim 3, wherein said sealing means has a convex inward configuration with respect to the drum and first annular member.

5. A device for sealing an aperture in a partition wall as defined in claim 2, wherein said means for producing a pressure other than atmospheric pressure is a vacuum pump and a conduit effecting communication between said vacuum pump and said sealing space, whereby said vacuum pump continuously evacuates said sealing space.

6. A device for sealing an aperture in a partition wall as defined in claim 5, wherein said sealing means has a concave inward configuration with respect to the drum and first annular member.

7. A device for sealing an aperture in a partition wall as defined in claim 1, wherein said first annular member is fixed to the drum, wherein said sealing means is fixed to said first annular member, wherein said sealing means includes a first sealing lip extending between said first annular member and said first surface and a second sealing lip extending between said first annular member and said second surface, and wherein said sealing means movingly engages said first and second surfaces of said second annular member.

8. A device for sealing an aperture in a partition wall as defined in claim 7, wherein said sealing means includes first and second oppositely disposed free edges and a central portion therebetween, said first sealing lip extending from said first free edge to said central portion, said second sealing lip extending from said second free edge to said central portion.

9. A device for sealing an aperture in a partition wall as defined in claim 8:
 (a) wherein said first annular member includes a main wall and, at the radially outermost portion of said main wall, a rigid annular rim with a surface generally perpendicular to said main wall, said central portion of said sealing means being affixed to said rim in abutting, face-to-face, overlying relationship therewith;
 (b) said first annular member and the rotatable drum having a common axis of rotation, said main wall of said first annular member being disposed in a plane perpendicular to said axis of rotation of said first annular member;
 (c) said first and second spaced surfaces of said second annular member being parallel to each other and parallel to said main wall of said first annular member;
 (d) said first and second surfaces thereby being disposed in planes perpendicular to the axis of rotation of said first annular member and drum;
 (e) said central portion of said sealing means being disposed in perpendicular relationship to said first and second spaced surfaces;
 (f) a portion of said first sealing lip adjacent said first free edge of said sealing means being disposed in parallel relationship with said first spaced surface, a portion of said second sealing lip adjacent said second free edge being disposed in parallel relationship with said second spaced surfaces;
 (g) said spaced surfaces being tangential to said sealing means.

10. A device for sealing an aperture in a partition wall as defined in claim 9, wherein said sealing means is a one piece, flexible, elastomeric member.

11. A device for sealing an aperture in a partition wall as defined in claim 9, wherein said second annular member includes an outer annular wall perpendicular to said first and second spaced surfaces and extending at least partially therebetween at the radially outermost portion of said second annular member, said outer annular wall and first and second spaced surfaces at least partially defining a radially inwardly facing recess in said second annular member, said radially inwardly facing recess having a mouth at a portion thereof in the region of the radially innermost side of said second annular member, said sealing means extending across said mouth to seal the same and to isolate said recess from the surrounding atmosphere to thereby provide said sealing space.

12. A device for sealing an aperture in a partition wall as defined in claim 11, wherein said second annular member includes first and second flanges which extend radially outwardly from said outer wall thereof, said flanges being parallel with the main wall of the first annular member and perpendicular to the axis of rotation thereof, said first outer flange including first gasket means, said second outer flange including second gasket means, said first outer flange and first gasket means being adapted for sealingly engaging one side of the partition wall, said second outer flange and second gasket means being adapted for sealingly engaging the other side of said partition wall.

13. An arrangement for separating septic and aseptic portions of a hospital laundry from each other, the arrangement comprising:
 (a) a partition wall, said partition wall defining on one side an aseptic area, the other side being an area which is not aseptic;
 (b) an aperture in said partition wall;
 (c) a rotatably mounted washing machine drum extending through said aperture both to said aseptic side of said partition wall and to said side of said partition wall which is not aseptic;
 (d) a first annular member attached to said drum and extending radially outwardly therefrom;
 (e) a second annular member attached to said partition wall and extending radially inwardly from said aperture therein, said second annular member having first and second spaced surfaces which partially define an annular sealing space;
 (f) sealing means extending between, on the one hand, said spaced surfaces of said second annular member, and, on the other hand, said first annular member;
 (g) whereby the opposite sides of said partition wall are isolated from each other by sealing space.

14. An arrangement as defined in claim 13, including means for producing a pressure other than atmospheric pressure in said sealing space.

15. An arrangement as defined in claim 14, wherein said means for producing a pressure other than atmospheric is a source of pressurized, purified air and a conduit effecting introduction of pressurized, purified air into said sealing space.

16. An arrangement as defined in claim 15, wherein said sealing means has a convex inward configuration with respect to the drum and first annular member.

17. An arrangement as defined in claim 13, wherein said means for producing a pressure other than atmospheric pressure is a vacuum pump and a conduit effecting communication between said vacuum pump and said sealing space, whereby said vacuum pump continuously evacuates said sealing space.

18. An arrangement as defined in claim 17, wherein said sealing means has a concave inward configuration with respect to the drum and first annular member.

19. An arrangement as defined in claim 13, wherein said first annular member is fixed to said drum, wherein said sealing means is fixed to said first annular member, wherein said sealing means includes a first sealing lip extending between said first annular member and said first surface and a second sealing lip extending between said first annular member and said second surface, and wherein said sealing means movingly engages said first and second surfaces of said second annular member.

20. An arrangement as defined in claim 19, wherein said sealing means includes first and second oppositely disposed free edges and a central portion therebetween, said first sealing lip extending from said first free edge to said central portion, said second sealing lip extending from said second free edge to said central portion.

21. An arrangement as defined in claim 20, wherein said sealing means is a one piece, flexible, elastomeric member.

22. An arrangement as defined in claim 20:
(a) wherein said first annular member includes a main wall and, at the radially outermost portion of said main wall, a rigid annular rim with a surface generally perpendicular to said main wall, said central portion of said sealing means being affixed to said rim in abutting, face-to-face, overlying relationship therewith;
(b) said drum having an axis of rotation, said main wall of said first annular member being disposed in a plane perpendicular to said axis of rotation of said drum;
(c) said first and second spaced surfaces of said second annular member being parallel to each other and parallel to said main wall of said first annular member;
(d) said first and second surfaces thereby being disposed in planes perpendicular to the axis of rotation of said drum;
(e) said central portion of said sealing means being disposed in perpendicular relationship to said first and second spaced surfaces;
(f) a portion of said first sealing lip adjacent said first free edge of said sealing means being disposed in parallel relationship with said first spaced surfaces, a portion of said second sealing lip adjacent said second free edge being disposed in parallel relationship with said second spaced surfaces;
(g) said spaced surfaces being tangential to said sealing means.

23. An arrangement as defined in claim 22, wherein said second annular member includes an outer annular wall perpendicular to said first and second spaced surfaces and extending at least partially therebetween at the radially outermost portions of said second annular member, said outer annular wall and first and second spaced surfaces at least partially defining a radially inwardly facing recess in said second annular member, said radially inwardly facing recess having a mouth at a portion thereof in the region of the radially innermost side of said second annular member, said sealing means extending across said mouth to seal the same and to isolate said recess from the surrounding atmosphere to thereby provide said sealing space.

24. An arrangement as defined in claim 23, wherein said second annular member includes a pair of flanges which extend radially outwardly from said outer wall thereof, said flanges being parallel with the main wall of the first annular member and perpendicular to said axis of said drum, said first outer flange including first gasket means, said second outer flange including second gasket means, said first outer flange and first gasket means sealingly engaging said one side of said partition wall, said second outer flange and second gasket means sealingly engaging said other side of said partition wall.

* * * * *